US012807489B2

(12) United States Patent
Russell

(10) Patent No.: US 12,807,489 B2

(45) Date of Patent: Nov. 24, 2026

(54) PROCESS FOR INCREASING HYDROGEN RECOVERY BY CHILLING HYDROGEN WITH PRODUCT $CO_2$ STREAM

(71) Applicant: UOP LLC, Des Plaines, IL (US)

(72) Inventor: Bradley Russell, Fall Branch, TN (US)

(73) Assignee: UOP LLC, Des Plaines, IL (US)

( * ) Notice: Subject to any disclaimer, the term of this patent is extended or adjusted under 35 U.S.C. 154(b) by 732 days.

(21) Appl. No.: 18/056,748

(22) Filed: Nov. 18, 2022

(65) Prior Publication Data

US 2024/0166509 A1 May 23, 2024

(51) Int. Cl.
*C01B 3/34* (2006.01)
*C01B 3/24* (2006.01)

(52) U.S. Cl.
CPC .................. *C01B 3/34* (2013.01); *C01B 3/24* (2013.01); *B01J 2208/00345* (2013.01); *B01J 2208/00752* (2013.01); *C01B 2203/0216* (2013.01); *C01B 2203/0238* (2013.01); *C01B 2203/025* (2013.01); *C01B 2203/0455* (2013.01)

(58) Field of Classification Search
CPC ..... C01B 2203/0485; C01B 3/34; C01B 3/23; C01B 2203/00
See application file for complete search history.

(56) References Cited

U.S. PATENT DOCUMENTS

| | | | | |
|---|---|---|---|---|
| 6,251,143 | B1 | 6/2001 | Schwartz et al. | |
| 8,021,464 | B2 | 9/2011 | Gauthier et al. | |
| 8,241,400 | B2 | 8/2012 | Grover | |
| 2010/0288123 | A1 | 11/2010 | Chen et al. | |
| 2011/0168605 | A1* | 7/2011 | Blevins | C10J 3/487 422/187 |
| 2012/0297822 | A1* | 11/2012 | Bailey | F25J 3/0625 62/617 |
| 2015/0323248 | A1 | 11/2015 | Terrien et al. | |
| 2019/0315640 | A1* | 10/2019 | Solunke | C02F 1/20 |

FOREIGN PATENT DOCUMENTS

| | | | |
|---|---|---|---|
| CN | 85109166 | A | 4/1987 |
| CN | 213679818 | U | 7/2021 |
| CN | 113247861 | A | 8/2021 |
| WO | 2017074790 | A1 | 5/2017 |
| WO | 2022003312 | A1 | 1/2022 |

OTHER PUBLICATIONS

International Search Report from corresponding PCT application No. PCT/US2023/079500, mailed Mar. 20, 2024.
Written Opinion from corresponding PCT application No. PCT/US2023/079500, mailed Mar. 20, 2024.
Extended European Search Report from corresponding European application No. 23892352.8, dated Sep. 16, 2026.

* cited by examiner

*Primary Examiner* — Anthony J Zimmer
*Assistant Examiner* — Eric Scott Sherman

(57) ABSTRACT

Processes for increasing hydrogen recovery are described. The processes use cold carbon dioxide-enriched product from the carbon dioxide recovery system to chill the hydrogen PSA feed stream. The carbon dioxide-enriched product stream comprises a supercritical carbon dioxide stream or a liquid carbon dioxide stream. The synthesis gas stream is typically chilled to a temperature in a range of 0° C. to 40° C. The temperature of the chilled synthesis gas stream is typically at least 10° C. lower than the temperature of the synthesis gas before chilling.

20 Claims, 2 Drawing Sheets

PROCESS FOR INCREASING HYDROGEN RECOVERY BY CHILLING HYDROGEN WITH PRODUCT $CO_2$ STREAM

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions or incentivizing $CO_2$ capture. Consequently, significant competition to lower the cost of hydrogen production while recovering the byproduct $CO_2$ for subsequent geological sequestration to capture the growing market is anticipated. $CO_2$ can be separated as a vapor to be supplied to a common pipeline, but more likely it will need to be produced in liquefied form for easy transport by truck or ship due to the current lack of $CO_2$ pipeline infrastructure in certain areas of the world.

The desired level of $CO_2$ emissions mitigated will depend on regional economic conditions, with some hydrogen producers prioritizing maximizing hydrogen production with $CO_2$ capture, others prioritizing minimal $CO_2$ emissions with hydrogen production, and some falling somewhere in-between. Another important factor is the reformer technology chosen for a given hydrogen production unit. For steam reforming plants, 50% to 60% $CO_2$ capture may be sufficient, while greater than 90% or greater than 95% may be expected for an autothermal reformer (ATR), gasifier, or partial oxidation (POX) reformer.

Most existing hydrogen production processes utilize pressure swing adsorption (PSA) to recover high-purity product hydrogen from shifted syngas. The low-pressure tail gas stream from the PSA unit is typically combusted to generate heat or steam for the process. If no stream is sent to a combustor, a purge is required to prevent impurity build-up in the process.

U.S. Pat. No. 8,021,464 describes a process for the combined production of hydrogen and $CO_2$ from a mixture of hydrocarbons which are converted to syngas. The syngas is separated in a pressure swing adsorption (PSA) unit into a hydrogen-enriched stream and a PSA offgas stream. The PSA offgas is compressed and dried, followed by several successive steps of condensing and separating the $CO_2$-rich condensate with the temperature being reduced at each step, the temperature ranging from ambient to −56° C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high-pressure hydrogen stream, a low pressure $CO_2$ stream, and a $CH_4$ rich stream which is withdrawn during a $CO_2$ co-purge step. Purified $CO_2$ from the $CO_2$ purification unit in the process is used as the co-purge in the PSA unit. The adsorption step is run at a pressure of about 250 psig to about 700 is psig. The pressure during the co-purge step is in the range of about 300 psig to about 800 psig, and the $CO_2$ co-purge stream is preferably introduced at a pressure higher than the pressure during the adsorption step. The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate side-draw further increases the cost and complexity of the process.

Therefore, there is a need for improved hydrogen production processes with improved, cost-effective hydrogen recovery.

DETAILED DESCRIPTION

Figure 1:
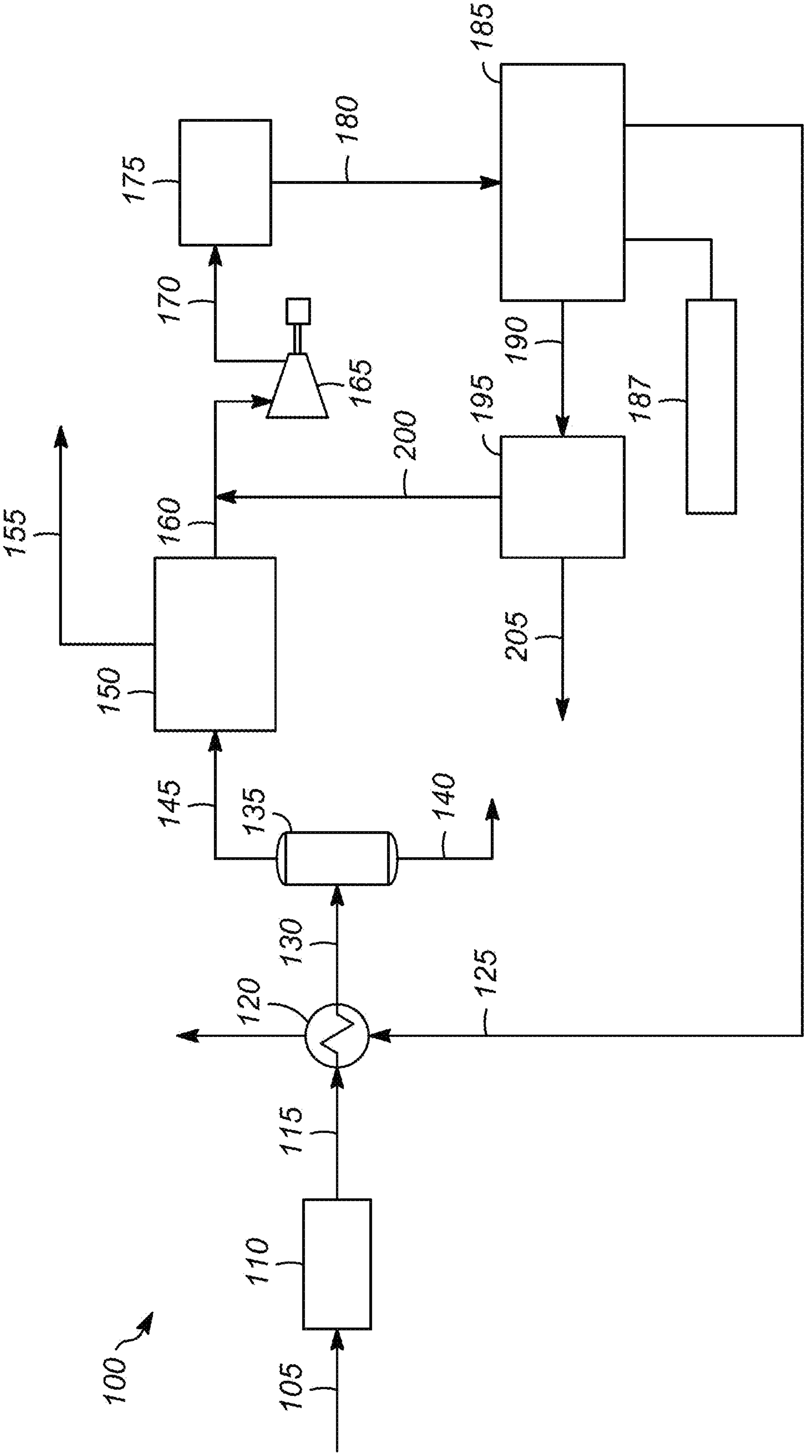
FIG. 1 is an illustration of one embodiment of a method of producing hydrogen and recovering $CO_2$ from a hydrogen production process.

The present processes use cold product $CO_2$ from the carbon dioxide recovery system to chill the hydrogen PSA feed stream. Lowering the PSA feed stream temperature increases the equilibrium capacity of the adsorbed components, with a resulting decrease in PSA bed volume and an increase in hydrogen recovery. This leads to a small but significant decrease in overall compression power due to higher hydrogen recovery and the decrease in tail gas temperature. Additional benefits include higher methanol removal in the condensate, thereby lowering trace methanol concentration to the downstream dehydration unit (methanol can be problematic in drier due to coking and decreased adsorbent life), and lower hydrogen product temperature with the potential elimination of the product cooler (customers often have a maximum hydrogen product is temperature specification, e.g., 40 to 50° C.).

The chilling is often essentially "free"—i.e., un-recovered chilling from the process that leaves the system boundary in the product $CO_2$ stream. The only added equipment is a heat exchanger for cross-exchanging the cold high-pressure $CO_2$ stream with the shifted syngas and a knock-out pot for removing the water condensate.

The hydrogen production process includes a synthesis gas production zone that produces synthesis gas. The synthesis gas production zone may comprise a new or existing syngas reactor, including, but not limited to, a steam reforming unit with an optional gas heated reformer, an autothermal reforming unit with an optional gas heated reformer, a gasification unit, or a partial oxidation (POX) unit, or combinations thereof.

The synthesis gas reactor produces an effluent which comprises a mixture of gases comprising hydrogen, carbon dioxide, water, and at least one of methane, carbon monoxide, nitrogen, and argon.

The synthesis gas reactor is typically followed by a water gas shift (WGS) unit to convert carbon monoxide to carbon dioxide. The effluent stream exiting the WGS unit is typically about 220° C. to 420° C.

Heat is recovered from WGS effluent stream (e.g., to produce steam) and then the effluent stream is typically further cooled using an air or water cooler to a temperature of about 35° C. to 60° C. The temperature is limited by the temperature of the air or water used in the cooler.

The effluent stream from the synthesis gas production zone is sent to a chiller where it exchanges heat with the carbon dioxide-enriched product stream from the carbon dioxide recovery system. The chiller comprises a heat exchanger, such as a shell-and-tube type. The carbon dioxide stream may be on the tube side of the heat exchanger, with the effluent stream on the shell side. The carbon dioxide-enriched product stream chills the synthesis gas effluent stream to a temperature in the range of 0° C. to 40° C., or 0° C. to 35° C., or 5° C. to 40° C., or 5° C. to 35° C. The temperature is typically at least 10° C. lower than the temperature of the synthesis gas before chilling.

The chilled synthesis gas stream is sent to a hydrogen pressure swing adsorption (PSA) unit for separation into a high-pressure hydrogen stream enriched in hydrogen and a hydrogen depleted tail gas stream comprising the remaining hydrogen, carbon dioxide, water, and the at least one of the methane, carbon monoxide, nitrogen, and argon. The high-pressure hydrogen stream typically contains about 85% to 90% of the hydrogen in the effluent, which is recovered.

The hydrogen depleted tail gas stream is compressed, dried, and sent to a $CO_2$ recovery system where it is separated into a $CO_2$-enriched product stream and an overhead stream comprising the hydrogen, and some carbon dioxide, and some of the at least one of the methane, carbon monoxide, nitrogen, and argon.

The overhead stream is sent to a second PSA unit that produces a low-pressure $CO_2$ stream enriched in carbon dioxide and an off-gas stream enriched in hydrogen and at least one of carbon monoxide, methane, nitrogen, and argon.

The off-gas stream may be sent to a second PSA unit (not shown) for separation into an additional purified high-pressure hydrogen product stream and a low pressure tail gas stream, which can be combusted as fuel, recycled to the synthesis gas production unit, or both. Alternatively, the off-gas stream can be sent to a gas turbine or co-generation system for generation of electric power er and steam. Another possibility is sending the off-gas stream to a membrane separation unit with the permeate being enriched in hydrogen which can be used as a clean fuel product and the residue recycled to the synthesis gas production unit.

The low-pressure $CO_2$ stream may be combined with the low-pressure tail gas stream from the hydrogen PSA unit and recycled to the $CO_2$ recovery system.

The $CO_2$ recovery unit may comprise an amine separation unit with a $CO_2$ chiller and liquefier, or a cryogenic fractionation unit, or a carbon dioxide PSA unit with a $CO_2$ chiller and liquefier, or combinations thereof. Chilling duty for these different types of $CO_2$ recovery units is generally provided by a mechanical refrigeration system using a suitable refrigerant and a vapor compression cycle. In some cases, a mixed refrigerant may be used in order to minimize compression power. For example, a three-component mixed refrigerant comprising propane, iso-pentane, and carbon dioxide can be used.

The $CO_2$-enriched product stream is used to chill the shifted syngas upstream of the hydrogen PSA unit. The $CO_2$-enriched product stream comprises supercritical carbon dioxide or liquid carbon dioxide. The liquid carbon dioxide is subcooled which means that the temperature is below the bubble-point (I.e., the saturation temperature) of the $CO_2$-enriched product stream. The pressure of a supercritical $CO_2$ product stream entering the syngas chiller may be in the range of 100 bar(g) to 200 bar(g), with a temperature of 0° C. to 20° C. The pressure of a subcooled liquid $CO_2$ product stream entering the syngas chiller may be in the range of 10 bar(g) to 20 bar(g), with a temperature of −30° C. to −50° C. The $CO_2$ product stream may comprise greater than 95 mol % $CO_2$, or greater than 99 mol % $CO_2$, or greater than 99.9 mol % $CO_2$.

In some embodiments, the shifted synthesis gas stream from the synthesis gas production zone is separated in an amine-based carbon dioxide capture unit into a carbon dioxide-depleted synthesis gas stream and a carbon dioxide-enriched stream. The carbon dioxide-enriched stream is compressed, dried, and liquefied. The liquefied carbon dioxide stream is used to chill the carbon dioxide-depleted synthesis gas stream and recovered. Water is removed from the chilled carbon dioxide-depleted synthesis gas stream. The resulting chilled carbon dioxide-depleted synthesis gas stream is sent to the hydrogen PSA unit for separation into a high-pressure hydrogen product stream and a tail gas stream.

FIG. 1 illustrates one embodiment of process 100 for producing a high-pressure hydrogen product stream enriched in hydrogen and a carbon dioxide-enriched product stream. The feed stream 105 is introduced into the hydrogen production process unit 110 where it is converted into synthesis gas. The synthesis gas mixture comprises hydrogen, carbon monoxide, carbon dioxide, methane, water, and inert gas. The synthesis gas mixture is sent to a water gas shift reactor in the hydrogen production process unit 110 to convert carbon monoxide to carbon dioxide.

The shifted synthesis gas stream 115 may have a temperature of 35° C. to 60° C., and a pressure of about 20 bar(g) to about 40 bar(g). The shifted synthesis gas may contain 70 to 80 mol % hydrogen, 15 to 25 mol % carbon dioxide, 1 to 4 mol % methane, 0.5 to 3 mol % carbon monoxide, 0 to 0.5 mol % nitrogen, 0.2 to 0.6 mol % water (saturated), 0 to 0.2 mol % argon, and 0 to 500 ppmv methanol.

The shifted synthesis gas stream 115 is sent to a heat exchanger 120 where it is chilled by contact with a carbon dioxide-enriched product stream 125 comprising super critical carbon dioxide or liquid carbon dioxide, as will be described below. The chilled synthesis gas stream 130, which has a temperature of about 0° C. to about 40° C., is sent to a knockout pot 135 where a water stream 140 is removed resulting in a chilled synthesis gas stream 145 having a lower level of water than the incoming chilled synthesis gas stream 130. In cases where methanol is present in the shifted syngas stream 115, a portion of the methanol will be removed with water stream 140.

The chilled synthesis gas stream 145 is sent to the hydrogen PSA unit 150 where it is separated into a high-pressure hydrogen product stream 155 and a low-pressure hydrogen-depleted tail gas stream 160.

The high-pressure hydrogen product stream 155 may have a temperature of 40 to 65° C. and a pressure of 20 to 40 bar(g), and it may contain 99.0 to 99.999 mol % hydrogen, less than 1 ppmv carbon dioxide, less than 1 ppmv to 1000 ppmv methane, less than 1 ppmv to 50 ppmv carbon monoxide, 0 to 2000 ppmv nitrogen, less than 1 ppmv water, 0 to 3000 ppmv argon, and less than 0.1 ppmv methanol.

The low-pressure hydrogen-depleted tail gas stream 160 may have a temperature of 20 to 40° C. and a pressure of 0.2 to 0.5 bar(g), and it may contain 20 to 30 mol % hydrogen, 50 to 70 mol % carbon dioxide, 2 to 15 mol % methane, 1 to 15 mol % carbon monoxide, 0 to 2 mol % nitrogen, 1 to 2 mol % water, 0 to 0.4 mol % argon, and 0 is to 1000 ppmv methanol.

The low-pressure hydrogen-depleted tail gas stream 160 is compressed in compressor 165 from a pressure in the range of about 110 kPa to about 200 kPa to a pressure in the range of about 3,000 kPa to about 6,000 kPa. The compressed tail gas stream 170 is dried in drier 175, and the compressed, dried tail gas stream 180 is sent to a sent to a $CO_2$ recovery unit 185 including refrigeration system 187 where it is separated into the carbon dioxide-enriched product stream 125 and an overhead stream 190. The carbon dioxide-enriched product stream 125 comprising supercritical carbon dioxide or liquid carbon dioxide is used to chill the synthesis gas and recovered.

The overhead stream 190 may have a temperature of 20 to 30° C. and a pressure of 40 to 50 bar(g), and it may contain 50 to 80 mol % hydrogen, 10 to 20 mol % carbon dioxide, 5 to 20 mol % methane, 5 to 20 mol % carbon monoxide, 0 to 20 mol % nitrogen, and 0 to 1 mol % argon.

The overhead stream 190 is sent to a second PSA unit 195 to form a low-pressure carbon dioxide stream 200 enriched in carbon dioxide and an off-gas stream 205 enriched in hydrogen and at least one of carbon monoxide, methane, nitrogen, and argon.

The low-pressure carbon dioxide stream 200 may have a temperature of 10 to 20° C. and a pressure of 0.3 to 0.5 bar(g), and it may contain 10 to 20 mol % hydrogen, 60 to 80 mol % carbon dioxide, 2 to 10 mol % methane, 2 to 10 mol % carbon monoxide, 0 to 10 mol % nitrogen, and 0 to 0.5 mol % argon. The off-gas stream 205 may have a temperature of 30 to 40° C. and a pressure of 40 to 50 bar(g), and it may contain 50 to 90 mol % hydrogen, 0.01 to 0.5 mol % carbon dioxide, 5 to 30 mol % methane, 5 to 30 mol % carbon monoxide, 0 to 20 mol % nitrogen, and 0 to 1 mol % argon.

In some embodiments, the off-gas stream 200 is combined with the tail gas stream 160 and sent to the compressor 165.

Figure 2:
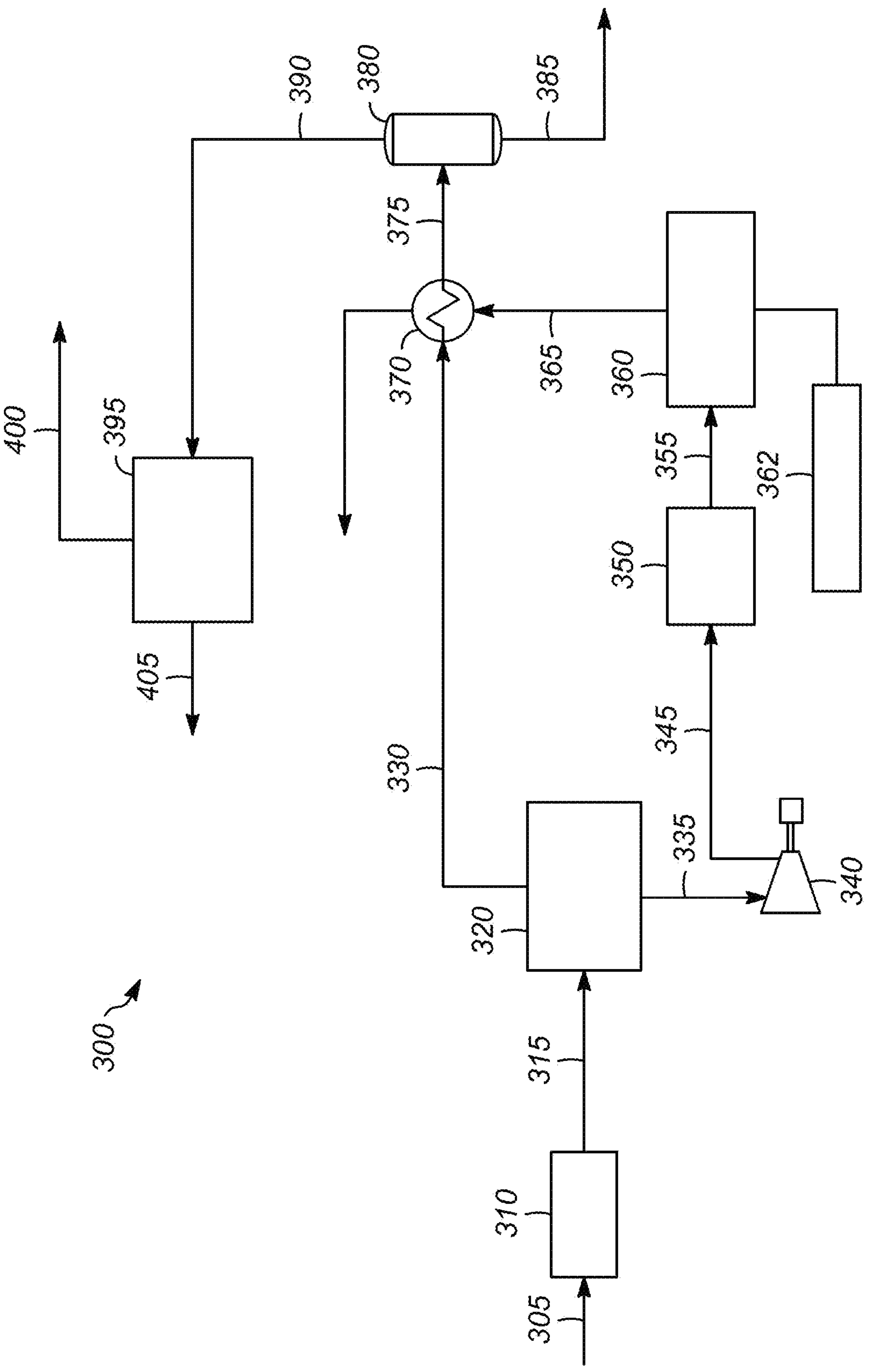
FIG. 2 is an illustration of another embodiment of a method of producing hydrogen and recovering $CO_2$ from a hydrogen production process.

FIG. 2 illustrates an alternate process 300 for producing a high-pressure hydrogen product stream enriched in hydrogen and a carbon dioxide-enriched product stream.

In this embodiment, the feed stream 305 is sent to the synthesis gas production zone 310 where it is converted into synthesis gas and carbon monoxide is converted to carbon dioxide.

The shifted synthesis gas stream 315 is separated in an amine-based carbon dioxide capture unit 320 into a carbon dioxide-depleted synthesis gas stream 330 and a carbon dioxide-enriched stream 335.

The carbon dioxide-depleted synthesis gas stream 330 may have a temperature of 20 to 40° C. and a pressure of 20 to 40 bar(g), and it may contain 90 to 98 mol % hydrogen, 50 ppmv to 0.5 mol % carbon dioxide, 1 to 5 mol % methane, 0.5 to 3.5 mol % carbon monoxide, 0 to 0.6 mol % nitrogen, 0.2 to 0.6 mol % water (saturated), 0 to 0.3 mol % argon, and methanol nil.

The carbon dioxide-enriched stream 335 may have a temperature of 30 to 50° C. and a pressure of 0.3 to 1.0 bar(g), and it may contain 0 to 1 mol % hydrogen, 85 to 95 mol % carbon dioxide, 0 to 0.1 mol % methane, 0 to 0.1 mol % carbon monoxide, 0 to 0.1 mol % nitrogen, 5 to 10 mol % water, and 0 to 0.1 mol % argon.

The carbon dioxide-enriched stream 335 is compressed in compressor 340, and the compressed carbon dioxide-enriched stream 345 is dried in dryer 350. The dried, compressed carbon dioxide-enriched stream 355 is liquefied in liquefier 360 including refrigeration system 362 to form a carbon-dioxide enriched product stream 365.

The carbon dioxide-enriched product stream 365 is sent to heat exchanger 370 to chill the carbon dioxide-depleted synthesis gas stream 330. The chilled carbon dioxide-depleted synthesis gas stream 375 is sent to knockout pot 380 to remove water forming a water stream 385 and a chilled synthesis gas stream 390 having a lower level of water than the chilled carbon dioxide-depleted synthesis gas stream 375.

The chilled synthesis gas stream 390 is sent to the hydrogen PSA unit 395 where it is separated into high-pressure hydrogen product stream 400 and a low-pressure tail gas stream 405. The high-pressure hydrogen product stream 400 is as described is above for the high-pressure hydrogen product stream 155.

The low-pressure hydrogen-depleted tail gas stream 405 has a temperature of 20 to 40° C. and a pressure of 0.2 to 0.5 bar(g), and it contains 70 to 80 mol % hydrogen, 0.1 to 3 mol % carbon dioxide, 2 to 20 mol % methane, 2 to 20 mol % carbon monoxide, 0 to 4 mol % nitrogen, 1 to 4 mol % water, 0 to 2 mol % argon, and methanol nil.

Example

An example of the process shown in FIG. 1 is given below in Table 1 for a shifted syngas stream from an autothermal reforming syngas production unit. An air cooler was used to cool the shifted syngas stream to 60° C. Following the air cooler, the shifted syngas was chilled with supercritical $CO_2$ from a cryogenic $CO_2$ fractionation process to a temperature of 30° C. and then routed to a hydrogen PSA unit. Lowering the syngas temperature from 60° C. to 30° C. resulted in increased hydrogen recovery from the PSA unit—from 86.5% to 88.5%. This benefit provided an overall compression power savings of 6% for the carbon capture unit. In addition, 65% of the methanol in the syngas was removed in the water condensate stream from the knock-out pot, resulting in lower methanol levels to the drier and extended dessicant life.

| | |
|---|---|
| Flow, $Nm^3$/hr | 150,000 |
| Pressure, bar(g) | 30 |
| Temp. ° C. | 60 |
| Composition, mol % | |
| Methane | 1.17 |
| Hydrogen | 72.59 |
| $CO_2$ | 24.48 |
| Carbon Monoxide | 0.63 |
| $N_2$ | 0.30 |
| Argon | 0.13 |
| Water | 0.66 |
| Methanol | 0.04 |
| Total | 100.00 |

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

The terms "hydrogen-enriched" and "stream enriched in hydrogen" mean that the hydrogen content/concentration of the product stream is higher than the inlet gas stream. For example, in some embodiments, the product stream may contain greater than mol % hydrogen, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

The terms "$CO_2$-enriched" and "stream enriched in $CO_2$" mean that the $CO_2$ content/concentration of the product stream is higher than the inlet gas stream. For example, in some embodiments, the product stream may contain greater than 40 mol % $CO_2$, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

As used herein, the term "about" means within 10% of the value, or within 5%, or within 1%.

SPECIFIC EMBODIMENTS

While the following is described in conjunction with specific embodiments, it will be understood that this description is intended to illustrate and not limit the scope of the preceding description and the appended claims.

A first embodiment of the invention is a process for increasing hydrogen recovery comprising introducing a feed stream comprising hydrocarbons or a carbonaceous feedstock to a synthesis gas production zone comprising a syngas reactor to produce a synthesis gas stream comprising hydrogen, carbon dioxide, and at least one of carbon monoxide, methane, water, nitrogen, and argon; chilling the synthesis gas stream to a temperature in a range of 0° C. to 40° C. with a carbon dioxide-enriched product stream from a carbon dioxide recovery system to form a chilled synthesis gas stream; removing at least a portion of the water from the chilled synthesis gas stream; introducing the chilled synthesis gas into a hydrogen pressure swing adsorption (PSA) unit to form a high-pressure hydrogen product stream enriched in hydrogen and a hydrogen-depleted tail gas stream; wherein the carbon dioxide-enriched product stream comprises a supercritical carbon dioxide stream or a liquid carbon dioxide stream. An embodiment of the invention is one, any or all of prior embodiments in this paragraph up through the first embodiment in this paragraph further comprising introducing the hydrogen-depleted tail gas stream into a carbon dioxide recovery system to form the carbon dioxide-enriched product stream and an overhead stream; separating the overhead stream in a second PSA unit to form a low-pressure carbon dioxide stream enriched in carbon dioxide and an off-gas stream enriched in hydrogen and at least one of carbon monoxide, methane, nitrogen, and argon; and-optionally recycling the low-pressure carbon dioxide stream to the carbon dioxide recovery system. An embodiment of the invention is one, any or all of prior embodiments in this paragraph up through the first embodiment in this paragraph further comprising compressing the hydrogen-depleted tail gas stream to form a compressed tail gas stream; and drying the compressed tail gas stream to form a dried compressed tail gas stream; and wherein introducing the hydrogen-depleted tail gas stream into the carbon dioxide recovery system comprises introducing the dried compressed tail gas stream into the carbon dioxide recovery system. An embodiment of the invention is one, any or all of prior embodiments in this paragraph up through the first embodiment in this paragraph wherein the carbon dioxide recovery unit comprises an amine separation unit, or a cryogenic separation unit, or a carbon dioxide PSA unit, or combinations thereof. An embodiment of the invention is one, any or all of prior embodiments in this paragraph up through the first embodiment in this paragraph further comprising separating the synthesis gas stream into a carbon dioxide-depleted synthesis gas stream and a carbon dioxide-enriched stream in an amine-based carbon dioxide capture unit before chilling the synthesis gas stream; and wherein chilling the synthesis gas stream comprises chilling the carbon dioxide-depleted synthesis gas stream. An embodiment of the invention is one, any or all of prior embodiments in this paragraph up through the first embodiment in this paragraph further comprising compressing the carbon dioxide-enriched stream to form a compressed carbon dioxide-enriched stream; and drying the compressed carbon dioxide-enriched stream to form a compressed, dried carbon dioxide-enriched stream; and chilling and liquefying the compressed, dried carbon dioxide-enriched stream to form a liquid carbon dioxide product stream. An embodiment of the invention is one, any or all of prior embodiments in this paragraph up through the first embodiment in this paragraph wherein the syngas reactor comprises a steam reforming unit with an optional gas heated reformer, or an autothermal reforming unit with an optional gas heated reformer, or a gasification unit, or a partial oxidation (POX) unit, or combinations thereof. An embodiment of the invention is one, any or all of prior embodiments in this paragraph up through the first embodiment in this paragraph wherein the synthesis gas production zone further comprises at least one treatment zone comprising a water gas shift reactor, a contaminant removal zone, or combinations thereof. An embodiment of the invention is one, any or all of prior embodiments in this paragraph up through the first embodiment in this paragraph wherein the contaminant removal zone comprises a sulfur removal zone. An embodiment of the invention is one, any or all of prior embodiments in this paragraph up through the first embodiment in this paragraph wherein the synthesis gas is chilled to a temperature in the range of 5° C. to 35° C. An embodiment of the invention is one, any or all of prior embodiments in this paragraph up through the first embodiment in this paragraph wherein the temperature of the chilled synthesis gas stream is at least 10° C. lower than the temperature of the synthesis gas before chilling. An embodiment of the invention is one, any or all of prior embodiments in this paragraph up through the first embodiment in this paragraph wherein the synthesis gas stream further comprises methanol, and wherein removing at least the portion of the water from the chilled synthesis gas stream further comprises removing at least a portion of the methanol from the chilled synthesis gas stream.

A second embodiment of the invention is a process for increasing hydrogen recovery comprising introducing a feed stream comprising hydrocarbons or a carbonaceous feedstock to a synthesis gas production zone comprising a syngas reactor to produce a synthesis gas stream comprising hydrogen, carbon dioxide, and at least one of carbon monoxide, methane, water, nitrogen, and argon; chilling the synthesis gas stream to a temperature at least 10° C. lower than a temperature of the synthesis gas before chilling with a carbon dioxide-enriched product stream from a carbon dioxide recovery system to form a chilled synthesis gas stream; removing at least a portion of the water from the chilled synthesis gas stream; introducing the chilled synthesis gas into a hydrogen pressure swing adsorption (PSA) unit to form a high-pressure hydrogen product stream enriched in hydrogen and a hydrogen-depleted tail gas stream; wherein the carbon dioxide-enriched product stream comprises a supercritical carbon dioxide stream or a liquid carbon dioxide stream. An embodiment of the invention is one, any or all of prior embodiments in this paragraph up through the second embodiment in this paragraph further comprising introducing the hydrogen-depleted tail gas stream into a carbon dioxide recovery system to form the carbon dioxide-enriched product stream and an overhead stream; separating the overhead stream in a second PSA unit to form a low-pressure carbon dioxide stream enriched in carbon dioxide and an off-gas stream enriched in hydrogen and at least one of carbon monoxide, methane, nitrogen, and argon; and recycling the low-pressure carbon dioxide stream to the carbon dioxide recovery system. An embodiment of the invention is one, any or all of prior embodiments in this paragraph up through the second embodiment in this paragraph wherein the syngas reactor comprises a steam reforming unit with an optional gas heated reformer, or an autothermal reforming unit with an optional gas heated reformer, or a gasification unit, or a partial oxidation (POX) unit, or combinations thereof. An embodiment of the invention is one, any or all of prior embodiments in this paragraph up through the second embodiment in this paragraph wherein the synthesis gas production zone further comprises at least one treatment zone comprising a water gas shift reactor, a contaminant removal zone, or combinations thereof. An embodiment of the invention is one, any or all of prior embodiments in this paragraph up through the second embodiment in this paragraph further comprising separating the synthesis gas stream into a carbon dioxide-depleted synthesis gas stream and a carbon dioxide-enriched stream in an amine-based carbon dioxide capture unit before chilling the synthesis gas stream; and wherein chilling the synthesis gas stream comprises chilling the carbon dioxide-depleted synthesis gas stream.

An embodiment of the invention is one, any or all of prior embodiments in this paragraph up through the second embodiment in this paragraph further comprising compressing the carbon dioxide-enriched stream to form a compressed carbon dioxide-enriched stream; and drying the compressed carbon dioxide-enriched stream to form a compressed, dried carbon dioxide-enriched stream; and chilling and liquefying the compressed, dried carbon dioxide-enriched stream to form a liquid carbon dioxide product stream. An embodiment of the invention is one, any or all of prior embodiments in this paragraph up through the second embodiment in this paragraph wherein the synthesis gas is chilled to a temperature in the range of 0° C. to 40° C. An embodiment of the invention is one, any or all of prior embodiments in this paragraph up through the second embodiment in this paragraph wherein the synthesis gas stream further comprises methanol, and wherein removing at least the portion of the water from the chilled synthesis gas stream further comprises removing at least a portion of the methanol from the chilled synthesis gas stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for increasing hydrogen recovery comprising:

introducing a feed stream comprising hydrocarbons or a carbonaceous feedstock to a synthesis gas production zone comprising a syngas reactor to produce a synthesis gas stream comprising hydrogen, carbon dioxide, and at least one of carbon monoxide, methane, water, nitrogen, and argon;

chilling the synthesis gas stream to a temperature in a range of 0° C. to 40° C. with a carbon dioxide-enriched product stream from a carbon dioxide recovery system to form a chilled synthesis gas stream;

removing at least a portion of the water from the chilled synthesis gas stream; and introducing the chilled synthesis gas into a hydrogen pressure swing adsorption (PSA) unit to form a high-pressure hydrogen product stream enriched in hydrogen and a hydrogen-depleted tail gas stream;

wherein the carbon dioxide-enriched product stream comprises a supercritical carbon dioxide stream or a subcooled liquid carbon dioxide stream.

2. The process of claim 1 further comprising:

introducing the hydrogen-depleted tail gas stream into the carbon dioxide recovery system to form the carbon dioxide-enriched product stream and an overhead stream;

separating the overhead stream in a second PSA unit to form a low-pressure carbon dioxide stream enriched in carbon dioxide and an off-gas stream enriched in hydrogen and at least one of carbon monoxide, methane, nitrogen, and argon; and optionally recycling the low-pressure carbon dioxide stream to the carbon dioxide recovery system.

3. The process of claim 2 further comprising:

compressing the hydrogen-depleted tail gas stream to form a compressed tail gas stream;

drying the compressed tail gas stream to form a dried compressed tail gas stream; and wherein introducing the hydrogen-depleted tail gas stream into the carbon dioxide recovery system comprises introducing the dried compressed tail gas stream into the carbon dioxide recovery system.

4. The process of claim 2 wherein the carbon dioxide recovery unit comprises an amine separation unit, or a cryogenic separation unit, or a carbon dioxide PSA unit, or combinations thereof.

5. The process of claim 1 further comprising:

separating the synthesis gas stream into a carbon dioxide-depleted synthesis gas stream and a carbon dioxide-enriched stream in an amine-based carbon dioxide capture unit before chilling the synthesis gas stream; and wherein chilling the synthesis gas stream comprises chilling the carbon dioxide-depleted synthesis gas stream.

6. The process of claim 5 further comprising:

compressing the carbon dioxide-enriched stream to form a compressed carbon dioxide-enriched stream;

drying the compressed carbon dioxide-enriched stream to form a compressed, dried carbon dioxide-enriched stream; and chilling and liquefying the compressed, dried carbon dioxide-enriched stream to form a liquid carbon dioxide product stream.

7. The process of claim 1 wherein the syngas reactor comprises a steam reforming unit with an optional gas heated reformer, or an autothermal reforming unit with an optional gas heated reformer, or a gasification unit, or a partial oxidation (POX) unit, or combinations thereof.

8. The process of claim 1 wherein the synthesis gas production zone further comprises at least one treatment zone comprising a water gas shift reactor, a contaminant removal zone, or combinations thereof.

9. The process of claim 8 wherein the contaminant removal zone comprises a sulfur removal zone.

10. The process of claim 1 wherein the synthesis gas is chilled to a temperature in the range of 5° C. to 35° C.

11. The process of claim 1 wherein the temperature of the chilled synthesis gas stream is at least 10° C. lower than the temperature of the synthesis gas before chilling.

12. The process of claim 1 wherein the synthesis gas stream further comprises methanol, and wherein removing at least the portion of the water from the chilled synthesis gas stream further comprises removing at least a portion of the methanol from the chilled synthesis gas stream.

13. A process for increasing hydrogen recovery comprising:

introducing a feed stream comprising hydrocarbons or a carbonaceous feedstock to a synthesis gas production zone comprising a syngas reactor to produce a synthesis gas stream comprising hydrogen, carbon dioxide, and at least one of carbon monoxide, methane, water, nitrogen, and argon;

chilling the synthesis gas stream to a temperature at least 10° C. lower than a temperature of the synthesis gas before chilling with a carbon dioxide-enriched product stream from a carbon dioxide recovery system to form a chilled synthesis gas stream;

removing at least a portion of the water from the chilled synthesis gas stream; and introducing the chilled synthesis gas into a hydrogen pressure swing adsorption (PSA) unit to form a high-pressure hydrogen product stream enriched in hydrogen and a hydrogen-depleted tail gas stream;

wherein the carbon dioxide-enriched product stream comprises a supercritical carbon dioxide stream or a sub-cooled liquid carbon dioxide stream.

14. The process of claim 13 further comprising:

introducing the hydrogen-depleted tail gas stream into the carbon dioxide recovery system to form the carbon dioxide-enriched product stream and an overhead stream;

separating the overhead stream in a second PSA unit to form a low-pressure carbon dioxide stream enriched in carbon dioxide and an off-gas stream enriched in hydrogen and at least one of carbon monoxide, methane, nitrogen, and argon; and recycling the low-pressure carbon dioxide stream to the carbon dioxide recovery system.

15. The process of claim 13 wherein the syngas reactor comprises a steam reforming unit with an optional gas heated reformer, or an autothermal reforming unit with an optional gas heated reformer, or a gasification unit, or a partial oxidation (POX) unit, or combinations thereof.

16. The process of claim 13 wherein the synthesis gas production zone further comprises at least one treatment zone comprising a water gas shift reactor, a contaminant removal zone, or combinations thereof.

17. The process of claim 13 further comprising:

separating the synthesis gas stream into a carbon dioxide-depleted synthesis gas stream and a carbon dioxide-enriched stream in an amine-based carbon dioxide capture unit before chilling the synthesis gas stream; and wherein chilling the synthesis gas stream comprises chilling the carbon dioxide-depleted synthesis gas stream.

18. The process of claim 17 further comprising:

compressing the carbon dioxide-enriched stream to form a compressed carbon dioxide-enriched stream;

drying the compressed carbon dioxide-enriched stream to form a compressed, dried carbon dioxide-enriched stream; and chilling and liquefying the compressed, dried carbon dioxide-enriched stream to form a liquid carbon dioxide product stream.

19. The process of claim 13 wherein the synthesis gas is chilled to a temperature in the range of 0° C. to 40° C.

20. The process of claim 13 wherein the synthesis gas stream further comprises methanol, and wherein removing at least the portion of the water from the chilled synthesis gas stream further comprises removing at least a portion of the methanol from the chilled synthesis gas stream.

* * * * *